(12) United States Patent
Liang et al.

(10) Patent No.: US 11,159,457 B2
(45) Date of Patent: Oct. 26, 2021

(54) CHATBOT ORCHESTRATION

(71) Applicant: International Business Machines Corporation, Armonk, NY (US)

(72) Inventors: Lin Chung Liang, New Taipei (TW); Chao Yuan Huang, Taipei (TW); Jen Ping Cheng, Taipei (TW); Po-Chun Lin, Taipei (TW); Yen Lin Li, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 16/681,108

(22) Filed: Nov. 12, 2019

(65) Prior Publication Data

US 2021/0144107 A1 May 13, 2021

(51) Int. Cl.
*H04L 12/58* (2006.01)
*G06N 5/04* (2006.01)
(Continued)

(52) U.S. Cl.
CPC ............ *H04L 51/02* (2013.01); *G06F 40/205* (2020.01); *G06F 40/30* (2020.01); *G06N 5/04* (2013.01); *G06N 20/00* (2019.01)

(58) Field of Classification Search
CPC ....... H04L 51/02; G06F 40/30; G06F 40/205; G06N 20/00; G06N 5/04
See application file for complete search history.

(56) References Cited

U.S. PATENT DOCUMENTS 62,839,580 * 4/2019 Vishnoi
10,594,840 B1 * 3/2020 Darby .................... H04W 4/14
(Continued)

FOREIGN PATENT DOCUMENTS

CN 101076060 A 11/2007
CN 101076061 A 11/2007

OTHER PUBLICATIONS

Huang, Louis, "Chatbots Orchestration and Multilingual Challenges—Part 1", Archive of the IBM Cloud Blog, Jan. 2, 2019, 3 pages, Evidence of Grace Period Use or Sale, <https://www.IBM.com/blogs/cloud-archive/?p=163311&preview=true&preview_id=163311>.
(Continued)

*Primary Examiner* — Caroline H Jahnige
(74) *Attorney, Agent, or Firm* — Christopher M. Pignato

(57) ABSTRACT

Orchestrated chat services utilizing a centralized chat service with access to a plurality of chatbots registered to the chat service. User's seeking support from the orchestrated chat service interact with a single user interface, while the backend of the chat service extracts the intents and entities from the user's input into the chat service. The orchestrated chat service identifies one or more classifications of chatbots suitable for responding to the user's input within a prescribed level of confidence dictated by one or more orchestration rules and selects a chatbot predicted to most likely respond to the user's input in a correct and accurate manner. The orchestrated chat service formats the user input and chat history into format of the selected chatbot's API, forwards user input and history to the selected chatbot and returns the response from the selected chatbot to the user interface of the orchestrated chat service.

17 Claims, 10 Drawing Sheets

(51) Int. Cl.
    *G06N 20/00*     (2019.01)
    *G06F 40/30*     (2020.01)
    *G06F 40/205*    (2020.01)

(56) References Cited

U.S. PATENT DOCUMENTS

| | | |
|---|---|---|
| 2004/0030750 A1 | 2/2004 | Moore |
| 2012/0041903 A1 | 2/2012 | Beilby |
| 2014/0122619 A1 | 5/2014 | Duan |
| 2014/0244712 A1 | 8/2014 | Walters |
| 2017/0269975 A1 | 9/2017 | Wood |
| 2018/0048594 A1 | 2/2018 | De Silva |
| 2018/0300337 A1 | 10/2018 | Thomas |
| 2018/0300399 A1* | 10/2018 | Blandin ............ H04L 51/02 |
| 2019/0019112 A1* | 1/2019 | Gelfenbeyn ......... G10L 15/30 |
| 2019/0104093 A1* | 4/2019 | Lim ............... G06F 11/1471 |
| 2019/0220773 A1* | 7/2019 | Terry ............... G06N 5/02 |
| 2019/0266287 A1* | 8/2019 | Chen ............... G06F 16/3329 |
| 2020/0259891 A1* | 8/2020 | Abraham ........... G06F 16/3329 |
| 2020/0342850 A1* | 10/2020 | Vishnoi ............ H04L 51/02 |

OTHER PUBLICATIONS

Mell et al., "The NIST Definition of Cloud Computing", National Institute of Standards and Technology, Special Publication 800-145, Sep. 2011, 7 pages.

Smiers, Leon, "Integrating the Chatbot", Capgemini, Jun. 26, 2017, 8 pages, <https://www.capgemini.com/2017/06/integrating-the-chatbot/>.

* cited by examiner

CHATBOT ORCHESTRATION

The following disclosure is submitted under 35 U.S.C. 102(b)(1)(A): DISCLOSURE: Huang, Louis, Chatbots Orchestration and Multilingual Challenges—Part 1, published Jan. 2, 2019, available at https://www.ibm.com/blogs/cloud-archive/?p=163311&preview=true&preview_id=163311.

TECHNICAL FIELD

The present disclosure relates generally to the field of service orchestration and more specifically to the orchestration of chatbot services.

BACKGROUND

A chatbot is a computer program that simulates interactive human conversation using pre-calculated user phrases, auditory and/or text-based signals. Chatbots are frequently used for basic customer service and marketing systems. Often, chatbots are integrated into instant messaging clients as well as operating systems equipped with "intelligent" virtual assistants. Other names for a chatbot can include an artificial conversation entity (ACE), chat robot, chatterbot or chatterbox. Modern chatbots can be frequently used in situations in which simple interactions are limited to a range of responses, where chatbots can provide answers to questions on topics such as products, services or company policies. Situations where the customer's questions exceed the capabilities of the chatbot, the customer can be redirected to a human operator. In other situations, additional chatbots that may be available, for example, over the Internet, with a specific knowledge domain that can help answer the customer's questions. However, in instances where customers must ask chatbots questions to ascertain which chatbots may be helpful to a user, the users may need to repeatedly ask different chatbots the same questions to find the right chatbot with the correct solution to the customer's problem.

SUMMARY

Embodiments of the present disclosure relate to a computer-implemented method, an associated computer system and computer program product for orchestrating chatbot services. The computer implemented method comprising: receiving, by a processor, user input from a chat service interface; extracting, by the processor, one or more intents and entities from the user input; matching, by the processor, the one or more intents and entities extracted from the user input to one or more chatbots maintained on a list of registered chatbots as a function of a classification associated with the one or more chatbots by a natural language classifier maintaining the list of registered chatbots; calculating, by the processor, a confidence interval indicating a probability that a matching chatbot is capable of correctly responding to the user input; selecting, by the processor, the matching chatbot from the list of registered chatbots with a highest confidence interval; verifying, by the processor, that the matching chatbot selected from the list of registered chatbots complies with orchestration rules; in response to verifying that the selection of the matching chatbot complies with the orchestration rules, routing, by the processor, the user input to the matching chatbot with the highest confidence interval and displaying, by a processor, a response from the matching chatbot with the highest confidence interval on the chat service interface.

BRIEF DESCRIPTION OF THE DRAWINGS

FIG. 2b depicts a block diagram of an embodiment of an analytics module integrated into the chatbot orchestration system depicted in the computing environment of FIG. 2a.

DETAILED DESCRIPTION

Figure 1:
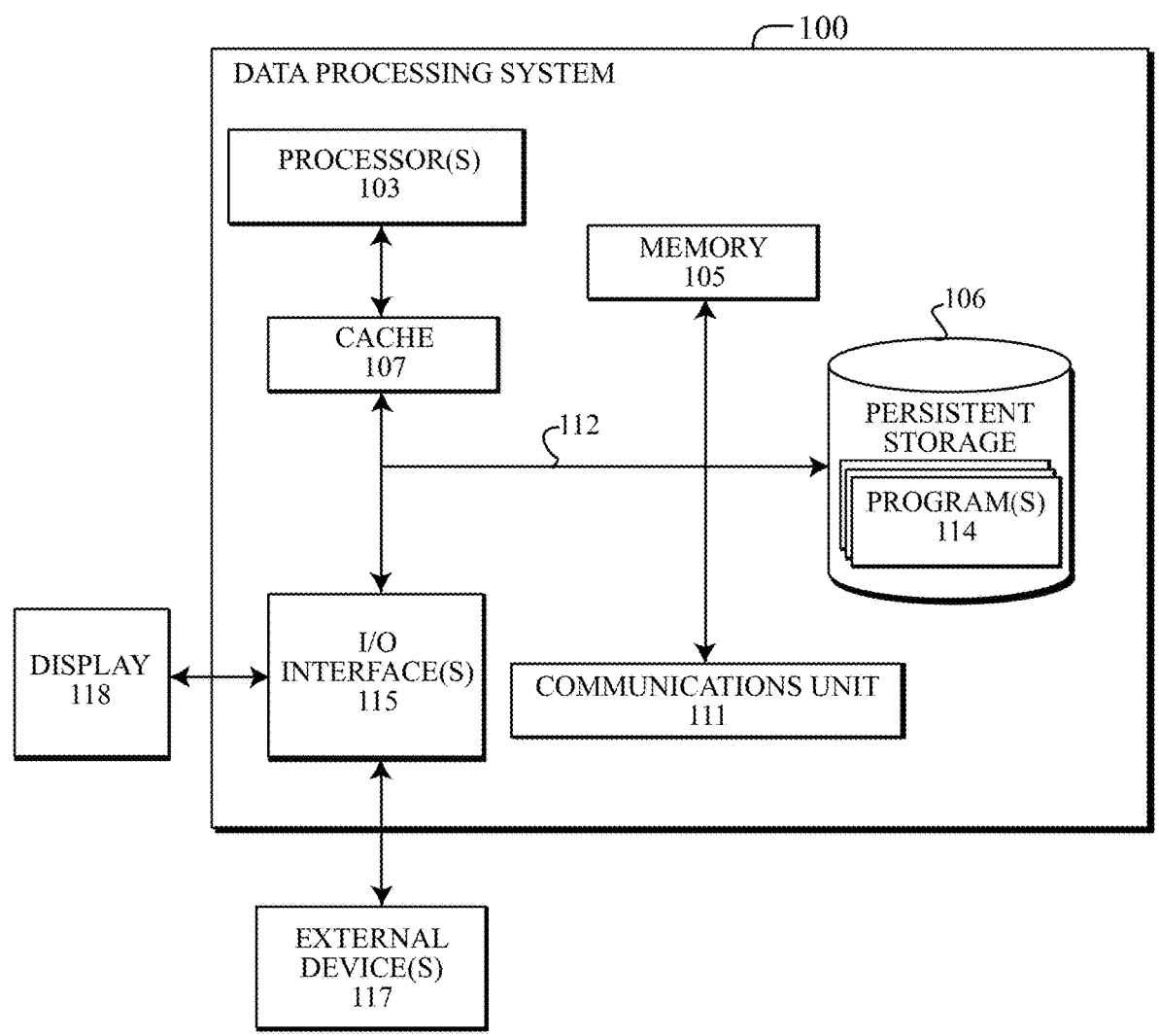
FIG. 1 depicts an embodiment of a block diagram of internal and external components of a data processing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Overview

Embodiments of the present disclosure recognize that manually finding the correct chatbot for obtaining support can be difficult and require copious amounts of searching, testing and interaction with each chatbot to find the one best suited for answering specific questions. Embodiments of the present disclosure provide a centralized chat service with a single point of communication with the user, who may access the knowledge from a plurality of chatbots registered with the chat service without having to manually find or engage with the chatbot to confirm the chatbot is the best one to use for a particular interaction. User's seeking support from the chat service can interact with a single user interface, while on the backend of the chat service, an appropriate chatbot for supporting the user and responding to the user's questions is identified, engaged and the resulting response is returned to the user and displayed on the chat service interface. The end result provides the user with a heterogenous chatbot experience on the front end of the interface, while orchestration occurs behind the chat service interface to find the best chatbot for the intents and entities associated with the user's input.

Chatbot owners may register one or more chatbots with an orchestrated chat service. During the registration process, the chatbot owners can provide descriptions of the chatbot being registered, along with one or more intents and entities associated with the chatbot to the chat service's natural language classifier. An "intent" may refer to a representation of the purpose of a user's input. Chatbot owners may define an intent for each type of user request the registered chatbot intends to support. An "entity" may refer to a term or object that is relevant to an intent and provides a specific context for an intent. For example, chatbots may list possible values for each entity and one or more synonyms a user might input into the chat service. Embodiments of the natural language classifier may generate a classification describing the types of requests (based on the intents, entities and description provided) that the registered chatbot handles. Each time a user provides input into a session of the chat service, the chat service may analyze the input for intents and/or entities and forward the analysis to the natural language classifier for further processing. Embodiments of the natural language classifier can process the user input using cognitive computing to return the select the closely matching classes, identify registered chatbots within the matching classes and calculate a confidence interval describing the probability that the registered chatbots within the matching classes will accurately and correctly respond to the user input.

Embodiments of the natural language classifier may request an orchestrator to select the best or most appropriate chatbot to provide an answer to the user's input, based on orchestrator's rules. For example, by selecting the chatbot within the matching classification with the highest confidence interval. Embodiments of the orchestrator verify that the selected chatbot complies with the orchestration rules and upon verification of rule compliance, convert the user input and chat session history from the native chat service format into a format of the selected chatbot's application programming interface (API). Once converted, the orchestrator can route the user input and chat session history to the selected chatbot. Embodiments of the orchestrator may receive the response from the selected chatbot, and forwarded the response to the chat service, where the response may be displayed for the user via the chat service interface.

Embodiments of the present disclosure may also identify and redirect users to one or more alternative resources in one or more situations based on one or more orchestration rules. For example, where the calculated confidence interval predictions for the registered chatbots is below a threshold level, the orchestration may forward the user input and chat session history to a human-operated support service, wherein a human operator can provide responses to the user's input. Alternatively, in other embodiments where the confidence interval predicting the most likely registered chatbot to respond to the user input falls below a selected threshold, the orchestrator may forward the user input and chat session history to an advanced AI discovery service capable of identifying a suitable chatbot that may not be registered with the chat service or the discovery service may use artificial intelligence and machine learning to respond directly to the user. In yet another example, the results of the natural language classifier may return a matching class with zero registered chatbots. Under such circumstances, the orchestration rules may indicate where results of registered chatbots within a classification are zero, the orchestrator may query a search engine for an unregistered chatbot of the designated classification or forward the chat session history and user input to the advanced AI discovery service, for further identification of a suitable chatbot capable of responding to the user's inputted questions.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing the computing operations described herein. Data processing system 100 may be representative of the one or more computing systems or devices depicted in the computing environment 200, 300, 600 as shown in FIGS. 2*a*-7, and in accordance with the embodiments of the present disclosure. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client systems, network devices, network terminals, thin clients, thick clients, kiosks, mobile communication devices (e.g., smartphones), multiprocessor systems, microprocessor-based systems, minicomputer systems, mainframe computer systems, smart devices, or Internet-of-Things (IoT) devices. The data processing systems 100 can operate in a networked computing environment 200, 600, and a distributed cloud computing environment 300, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, communications, and network processors, etc.), memory 105, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software applications, program(s) 114, applications and services, described herein, may be stored in memory 105 and/or persistent storage 106 for execution and/or access by one or more of the respective processor(s) 103 of the computer system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards, 3G, 4G, or 5G wireless interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data of program(s) 114 can be loaded into persistent storage 106.

One or more I/O interfaces 115 may allow for input and output of data with other devices that may be connected to data processing system 100. For example, I/O interface 115 can provide a connection to one or more external devices 117 such as one or more smart devices, IoT devices, recording devices such as an audio system, camera systems, one or more sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, a computer monitor or screen. Human-readable display 118 can also be an incorporated display and may function as a touch screen, such as a built-in display of a tablet computer.

System for Orchestrating Chat Services and Chatbots

Referring to the drawings, FIGS. 2a-7 depict an approach that can be executed using one or more data processing systems 100 operating within a computing environment 200, 300, 600 and variations thereof to implement systems, methods and computer program products for orchestrating heterogenous chat services. Embodiments of computing environments 200, 300, 600 may include one or more data processing systems 100 interconnected via a device network 250. The data processing systems 100 connected to the device network 250 may be specialized systems or devices that may include, but are not limited to, the interconnection of one or more chatbot orchestration system 201, user system 235, chatbots 241a-241n (referred to generally as chatbots 241) and one or more servers or other systems hosting search engine(s) 238, discovery service(s) 239 and human support service(s) 240.

The data processing systems 100 exemplified in FIGS. 2a-7, may not only comprise the elements of the systems and devices depicted in the drawings of FIGS. 2a-7, but these specialized data processing systems depicted may further incorporate one or more elements of a data processing system 100 shown in FIG. 1, and described above. Although not shown in the figures, one or more elements of the data processing system 100 may be integrated into the embodiments of chatbot orchestration system 201, user system 235, chatbots 241, and other systems hosting search engine(s) 238, discovery service(s) 239 and human support service(s) 240, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Embodiments of the chatbot orchestration system 201, user system 235, chatbots 241, search engine(s) 238, discovery service(s) 239 and human support service(s) 240, may be placed into communication with one another via computer network 250. Embodiments of network 250 may be constructed using wired, wireless or fiber-optic connections. Embodiments of the chatbot orchestration system 201, user system 235, chatbots 241, search engine(s) 238, discovery service(s) 239 and human support service(s) 240, may connect and communicate over the network 250 via a communications unit 111, such as a network interface controller, network interface card or other network communication device capable of facilitating a connection with network 250. In some embodiments of computing environments 200, 300, 600, one or more chatbot orchestration system 201, user system 235, chatbot 241 or other data processing systems 100 may represent data processing systems 100 utilizing clustered computers and components acting as a single pool of seamless resources when accessed through network 250. For example, such embodiments can be used in a data center, cloud computing, storage area network (SAN), and network-attached storage (NAS) applications.

Embodiments of the communications unit 111 may implement specialized electronic circuitry, allowing for communication using a specific physical layer and a data link layer standard. For example, Ethernet, Fiber channel, Wi-Fi or Token Ring to transmit data between the chatbot orchestration system 201, user system 235, chatbots 241, search engine(s) 238, discovery service(s) 239 and human support service(s) 240 connected to network 250. Communications unit 111 may further allow for a full network protocol stack, enabling communication over network 250 to groups of chatbot orchestration system 201, user system 235, chatbots 241, search engine(s) 238, discovery service(s) 239, human support service(s) 240 and other data processing systems 100 linked together through communication channels of network 250. Network 250 may facilitate communication and resource sharing among chatbot orchestration system 201, user system 235, chatbots 241, search engine(s) 238, discovery service(s) 239, human support service(s) 240 and other data processing systems 100 (for example, network-accessible storage media) connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
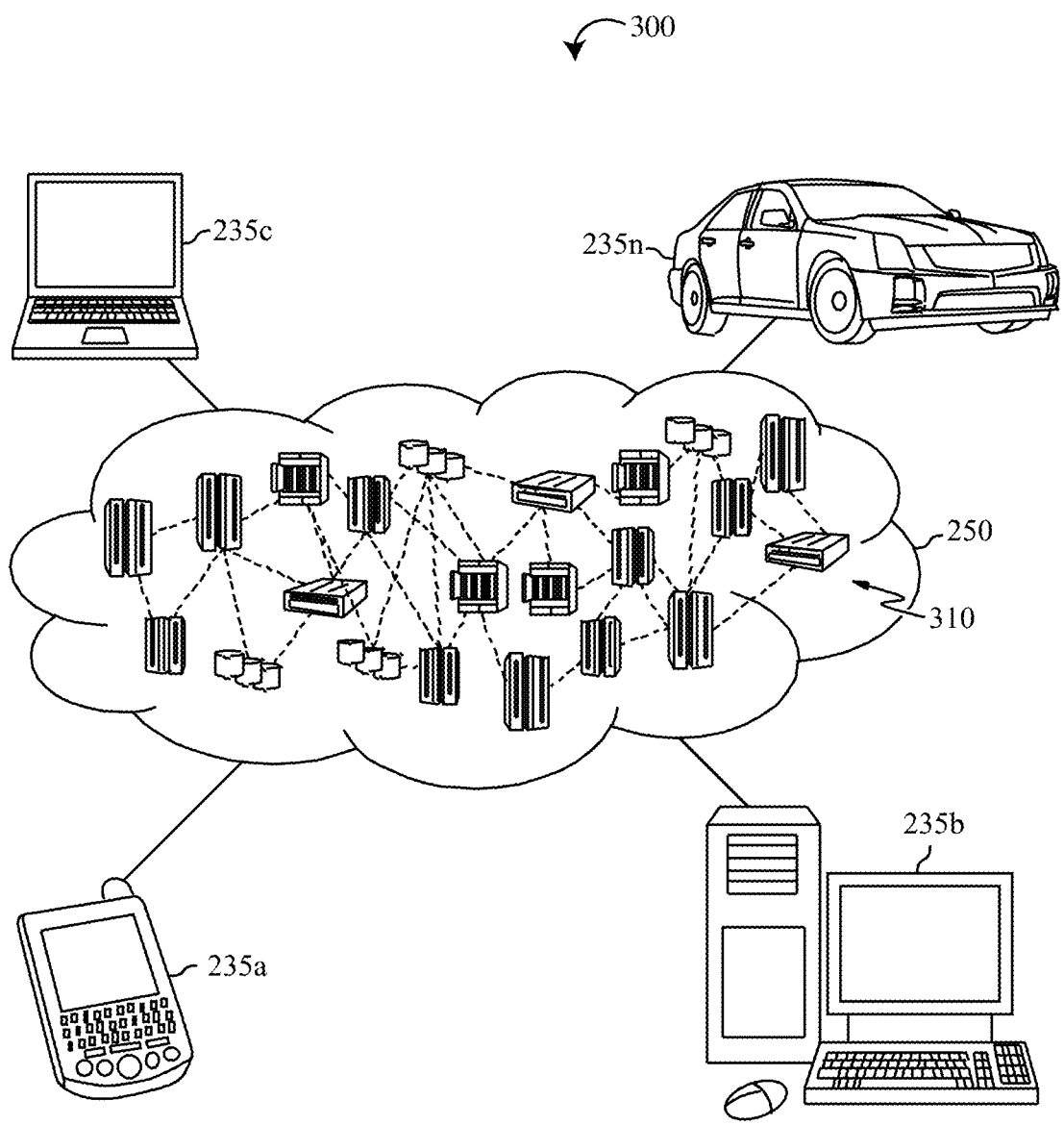
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which user system 235 operates as a client controlled by the cloud consumers. User system 235 may communicate with the cloud computing environment 300, for example via user systems 235a, 235b, 235c, 235n as illustrated in FIG. 3. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a user system 235. It is understood that the types of user systems 235 connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
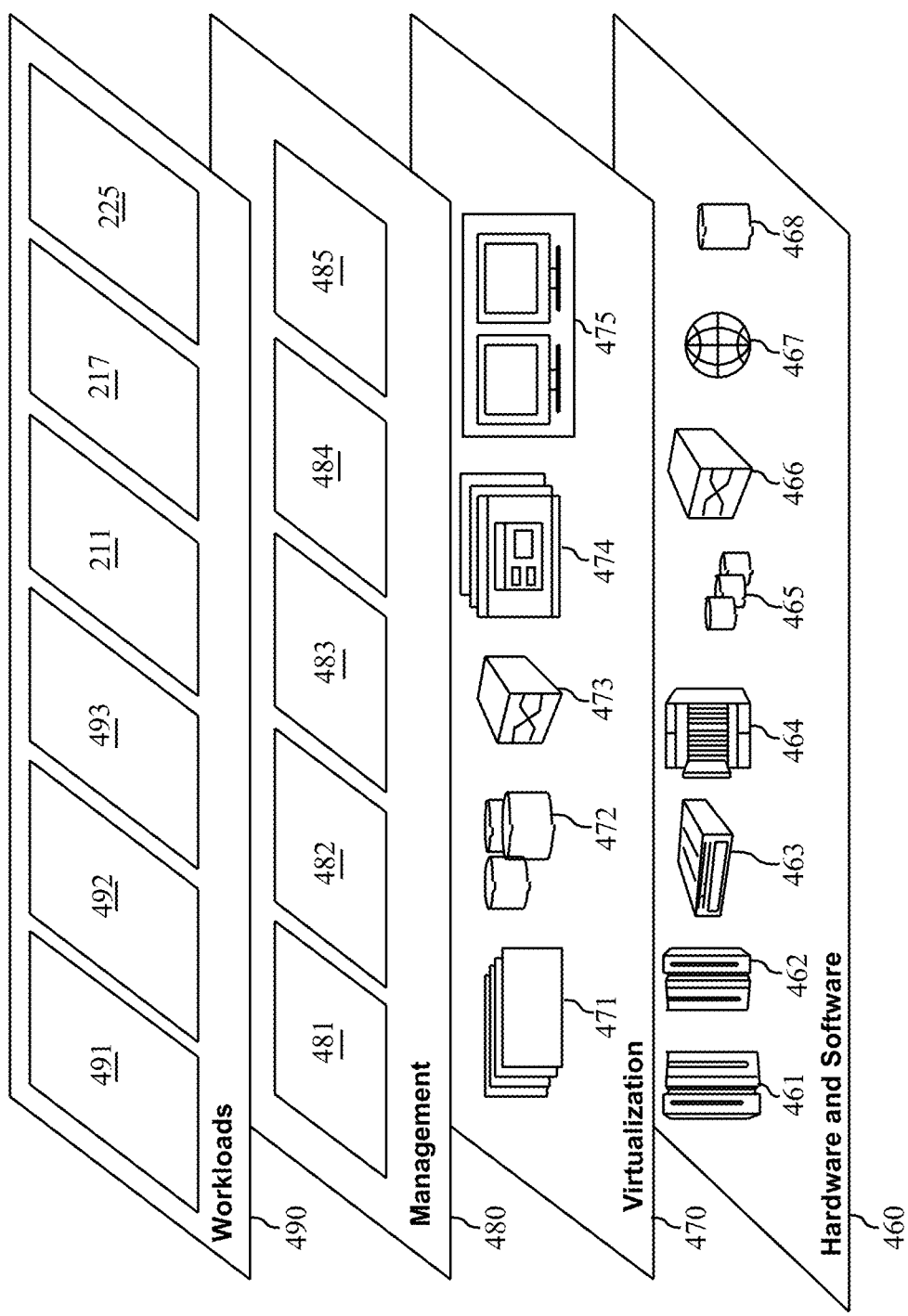
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping 491, software development and lifecycle management 492, data analytics processing 493, natural language classifier 211, orchestrator service 217, and chat services 225.

Referring back to FIG. 2a, FIG. 2a depicts an embodiment of a computing environment 200 capable of providing orchestrated chat services 225 to one or more users accessing the chatbot orchestration system 201 via a chat service interface 237. Embodiments of computing environment 200 feature a network 250 connected to a plurality of specialized data processing systems 100, including chatbot orchestration system 201, user system 235, chatbots 241, and one or more systems comprising a search engine 238, discovery service 239 and/or human support service 240. The specialized data processing systems 100 of computing environment 200 may comprise specialized configurations of hardware, software or a combination thereof, as shown and described herein, including specialized modules for implementing one or more particular tasks, functions, or processes associated with orchestrating the chat services 225 and delivering chat services 225 to one or more user systems 235. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized data processing systems 100 operating as part of the computing environment 200. For example, chat services 225, orchestrator service 217 and/or natural language classifier 211 depicted in FIG. 2a, loaded into the memory 105 or persistent storage 106 of the chat orchestration system 201.

Figure 2A:
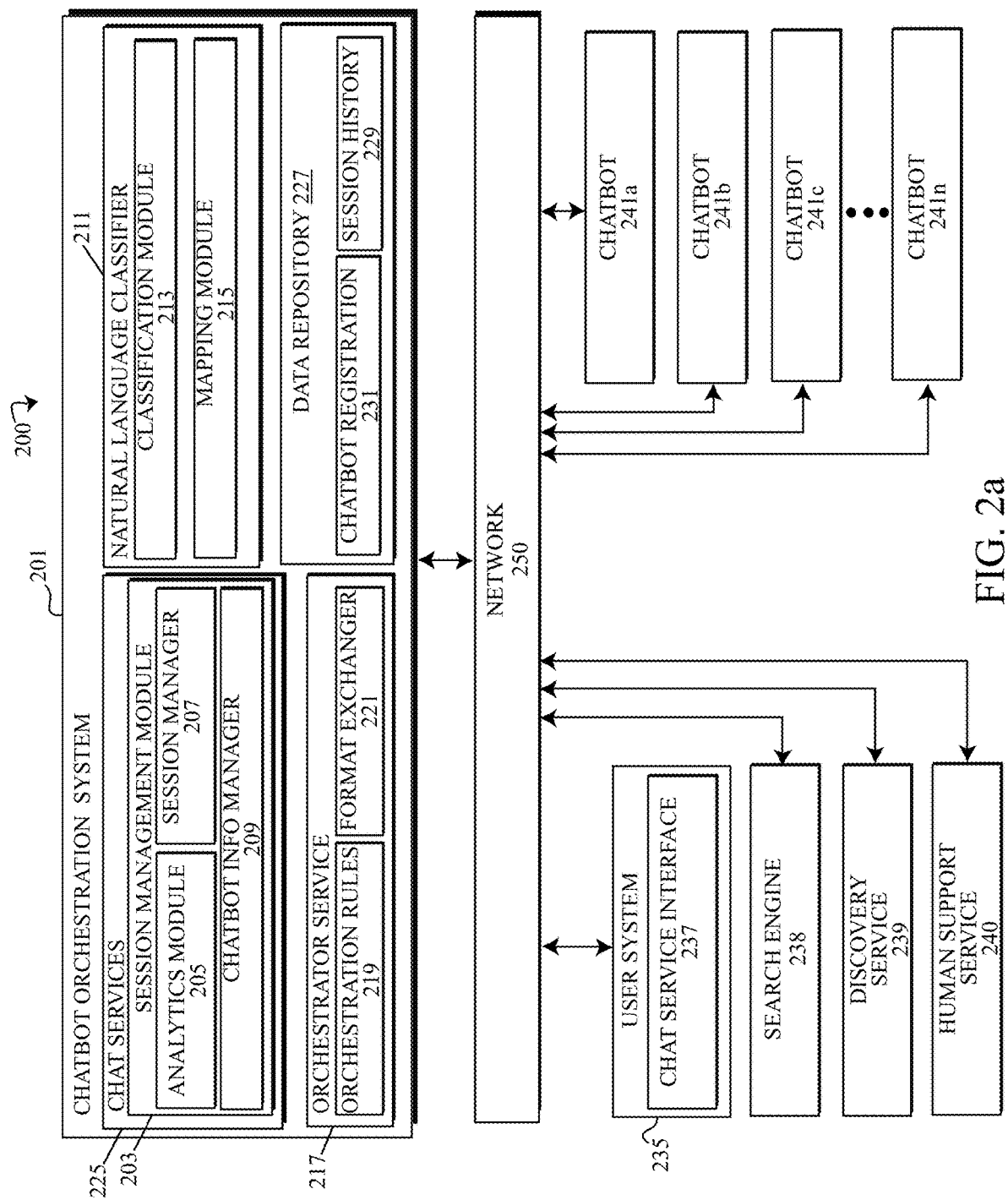
FIG. 2a depicts a block diagram of an embodiment of a computing environment for orchestrating and delivering heterogenous chat services to users from a plurality of registered chatbots, in accordance with the present disclosure.

As shown in the exemplary embodiment of FIG. 2a, embodiments of the computing environment 200 depict a chat orchestration system 201. The chat orchestration system 201 may be a computer system or another type data processing system 100 connected to network 250, which may provide applications, programs and services to other systems or users connected to the network 250. As shown in FIG. 2a, the chat orchestration system 201 may provide chat services 225 orchestrated using one or more chatbots 241 registered with the chatbot orchestration system 201 and/or one or more additional alternative resources to the registered chatbots 241. Alternative resources may include but not limited to one or more search engines 238, discovery services 239 and/or human support services 240. Embodiments of the orchestration system 201 may execute program code configured to implement the orchestrated chat services 225, including the execution of program code directed toward one or more functions or tasks of the natural language classifier 211, and orchestrator service 217. The tasks executed by the chatbot orchestration system includes, but is not limited to registering one or more chatbots 241, classifying chatbots as a function of a description, intents, and entities provided to the natural language classifier 211 during registration; managing chat service 225 sessions; identifying one or more applicable chatbots 241 to respond to user input; requesting a response from one or more registered chatbot 241 and delivering chatbot 241 responses to user system(s) 235.

Embodiments of the chat orchestration system 201 may comprise a chat service 225. Chat service 225 performs the task or function of facilitating real-time (or near real-time) communication between a user system 235 and a chatbot 241 registered with the chatbot orchestration system 201, as well as alternative resources such as an unregistered chatbot, and/or a human-support service 240, using an instant messaging application or other communication applications. Embodiments of the chat service 225 may comprise a session management module 203 implementing one or more features of the chat service 225. Embodiments of the session management module 203 may receive a user's question as user input, maintain histories of user conversation sessions within a session history 229, and analyze user input entered into the chat service 225. In some embodiments, the session management module 203 may identify one or more intents and/or entities present in the user's input, store historical user intents and entities of the chat session, log session history 229, maintain a list of active registered chatbots 241, maintain a list of chatbot nodes returned to the chat service 225 by orchestrator service 217, receive and/or display the answers from one or more chatbots 241 selected by orchestrator service 217, maintain user profiles, collect user ratings, feedback and log overall satisfaction of the user with the appropriateness of the chatbots 241 selected by orchestration system 201. Embodiments of the session management module 203 may include one or more sub-modules or sub-programs implementing the tasks or functions of the session management module 203. For example, the exemplary embodiment of FIG. 2a depicts an analytics module 205, session manager 207 and chatbot information manager 209.

Figure 2B:
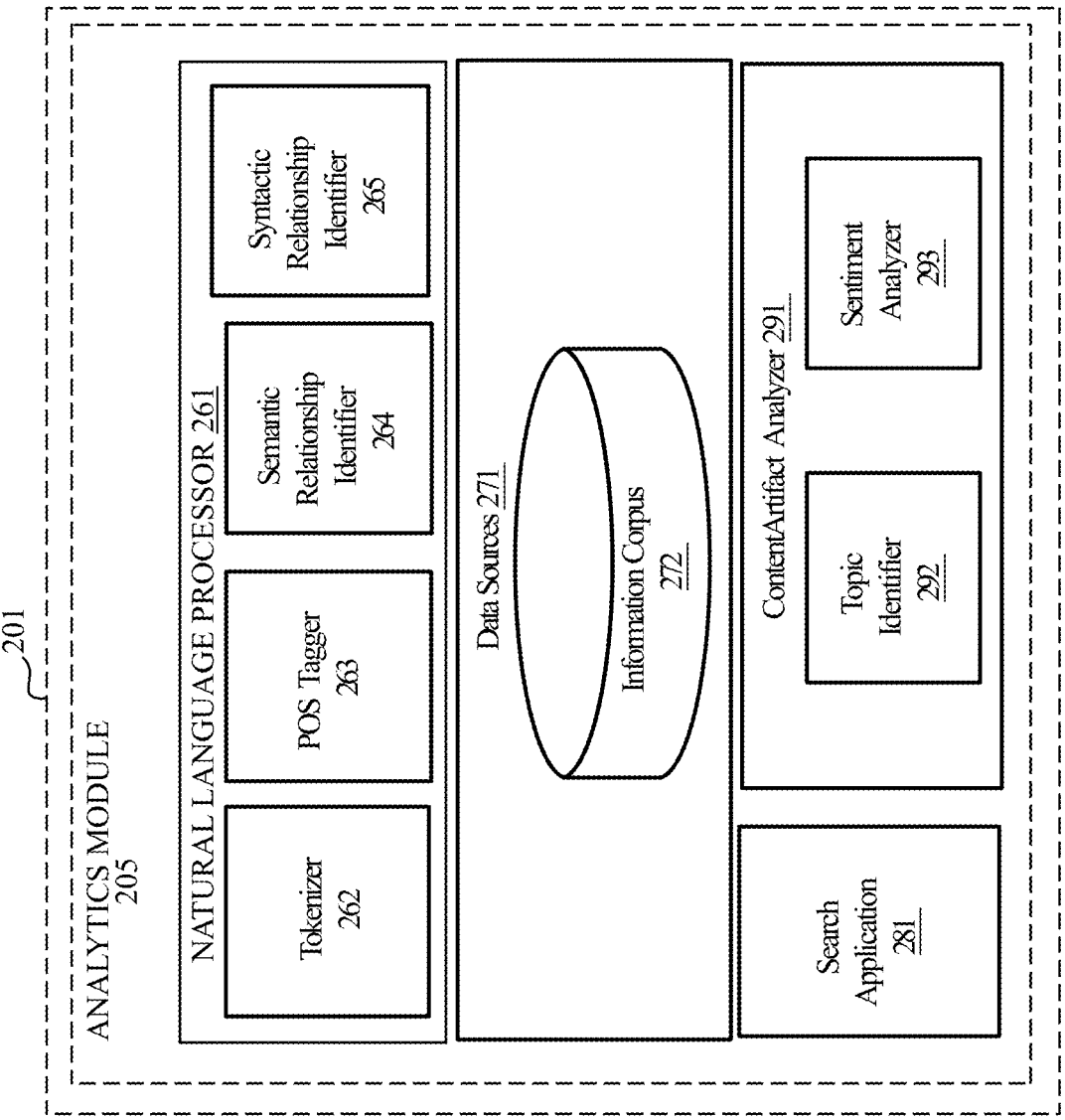

Embodiments of the session management module 203 may include an analytics module 205. Analytics module 205 perform tasks and functions associated with analyzing user input entered into the chat services 225 and may scan the user input for one or more intents or entities to help identify the topics and subject matter of the user input, the tone or sentiment of the user and potential classifications that may be relevant to the user input. Turning to FIG. 2b, a block diagram of an analytics module 205 is depicted comprising one or more components and features. Embodiments of the analytics module 205 may be configured to analyze content artifacts and/or textual/audio media of user input entered into the chat service 225 via the chat service interface 237. In some embodiments, user system 235 may transmit raw textual/audio data (e.g., a content artifact or a textual/audio medium) and send user input in the form of unstructured textual documents/transcripts (e.g., "electronic documents") to the chat service 225, wherein the analytics module 205 may conduct an analysis of the user input. Embodiments of the analytics module 205 may be part of the chat orchestration system 201, a separate standalone device, or part of a broader computer system.

Consistent with various embodiments, the analytics module 205 may respond to user input received from user system 235. Specifically, the analytics module 205 may analyze an unstructured textual document (e.g., a content artifact) to identify one or more terms, associated with the content topic, including one or more intents and/or entities evidenced by the user input. In some embodiments, the analytics module 205 may include a natural language processor 261, data sources 271, a search application 281, and a content artifact analyzer 291. The natural language processor 261 may comprise a computer module that analyzes the received unstructured textual conversation transcript(s) and other electronic documents provided to the chat service 225 as user input. The natural language processor 261 may perform various methods and techniques for analyzing user input (e.g., syntactic analysis, semantic analysis, etc.). The natural language processor 261 may be configured to recognize and analyze any number of natural languages. In some embodiments, the natural language processor 261 may parse passages of the user input. Further, the natural language processor 261 may include various modules to perform analyses of the user input. These modules may include, but are not limited to, a tokenizer 262, a part-of-speech (POS) tagger 263, a semantic relationship identifier 264, and a syntactic relationship identifier 265.

Embodiments of tokenizer 262 may be a computer module that performs lexical analysis. The tokenizer 262 may convert a sequence of characters into a sequence of tokens. A token may be a string of characters included in the user input and/or an electronic documents provided by the user and categorized as a meaningful symbol. Further, in some embodiments, the tokenizer 262 may identify word boundaries of the text inputted into the chat service 225 and break text passages within the user input into component text elements, such as words, multiword tokens, numbers, and punctuation marks. In some embodiments, the tokenizer 262 may receive a string of characters, identify the lexemes in the string, and categorize them into tokens.

Consistent with various embodiments, the POS tagger 263 may be a computer module that marks up a word in passages to correspond to a particular part of speech. The POS tagger 263 may read a passage or other text in natural language and assign a part of speech to each word or other token. The POS tagger 263 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed user inputs (e.g., the content of one formula may shed light on the meaning of text elements in another formula). In embodiments, the output of the natural language processor 261 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 263 may assign include, but are not limited to, comparative or superlative adverbs, wh-adverbs, conjunctions, determiners, negative particles, possessive markers, prepositions, wh-pronouns, and the like. In some embodiments, the POS tagger 263 may tag or otherwise annotate tokens of a passage with part of speech categories. In some embodiments, the POS tagger 263 may tag tokens or words of a passage to be parsed by the natural language processor 261.

In some embodiments, the semantic relationship identifier 264 may be a computer module that may be configured to identify semantic relationships of recognized text elements (e.g., words, phrases) in user input and/or documents transmitted by the user system 235 to the chat services 225. In some embodiments, the semantic relationship identifier 264 may determine functional dependencies between entities and other semantic relationships.

Consistent with various embodiments, the syntactic relationship identifier 265 may be a computer module that may be configured to identify syntactic relationships in a passage composed of tokens. The syntactic relationship identifier 265 may determine the grammatical structure of sentences such as, for example, which groups of words are associated as phrases and which word is the subject or object of a verb. The syntactic relationship identifier 265 may conform to formal grammar.

In some embodiments, the natural language processor 261 may be a computer module that may parse user input and generate corresponding data structures for one or more portions of the input. For example, in response to receiving an unstructured textual report at chat service 225, the natural language processor 261 of the analytics module 205 may output parsed text elements from the report as data structures. In some embodiments, a parsed text element may be represented in the form of a parse tree or other graph structure. To generate the parsed text element, the natural language processor 261 may trigger computer modules 262-265.

In some embodiments, the output of natural language processor 261 may be used by search application 281 to perform a search of a set of (e.g., one or more) corpora to retrieve information regarding content artifacts and/or media. As used herein, a corpus may refer to one or more data sources 271. In some embodiments, the data sources 271 may include data warehouses, information corpora, data models, and document repositories. In some embodiments, the data sources 271 may include an information corpus 272. The information corpus 272 may enable data storage and retrieval. In some embodiments, the information corpus 272 may be a storage mechanism that houses a standardized, consistent, clean, and integrated list of conversation topics and/or emotional sentiments. The information corpus 272 may also store, for each topic/sentiment, a list of associated outcomes. For example, the information corpus 272 may include a ranking of conversational topics for each user, and/or a profile for each user. The data may be sourced from various operational systems. Data stored in the information corpus 272 may be structured in a way to specifically address reporting and analytic requirements. In some embodiments, the information corpus 272 may be a data repository, a relational database, triplestore, or text index.

In some embodiments, the content artifact analyzer 291 may be a module that identifies conversational topics and user sentiments associated with one or more topics. In some embodiments, the content artifact analyzer 291 may include a topic identifier 292 and a sentiment analyzer 293. When an unstructured textual input is received by the analytics module 205, the content artifact analyzer 291 may be configured to analyze the user input using natural language processing to identify one or more content topics, including one or more intents and entities associated with the user input. The content artifact analyzer 291 may first parse the conversation generated by the user input using the natural language processor 261 and related subcomponents 262-265. After parsing the conversation, the topic identifier 292 may identify one or more topics present in the content of the user input. This may be done, for example, by searching a dictionary (e.g., information corpus 272) using the search application 281.

The sentiment analyzer 293 may determine the content sentiment for the user input, according to the content topic identified by topic identifier 293. This may be done by using the search application 291 to traverse the various data sources (e.g., the information corpus 272) for information regarding the terms and phrases used within the user input. The sentiment analyzer 293 may search, using natural language processing, documents from the various data sources 271 for terms related to those detected in the user input.

Embodiments of the session management module 203 may further comprise a session manager 207. The session manager 207 may perform functions or tasks during a chat service 225 that manage the session runtime environment including storing and logging the events of the session runtime for future reference by the session management module 203. For example, the session manager 207 may log chat histories, including responses provided to users from one or more chatbots 241 as part of the session history 229. Embodiments of the session manager 207 may receive and execute requests to initiate a user session in the chat service 225, receive user input via the chat service interface 237, and transmit user input to the analytics module 205 which may be outputted from the analytics module 205 to the natural language classifier 211 for further identification of the appropriate chatbot classification and/or chatbot mapping in order to orchestrate the response to the user input. Embodiments of the session manager 207 may also close chat services 225 at the conclusion of a chat service 225 session and/or may maintain a historical list or file describing one or more intents and/or entities of user input entered into the chat services 225 during the chat service 225 session.

In some embodiments, the session manager 207 may load and store user profiles describing user behavior, preferences and interests of the user during the chat service 225 session, as well as maintain user ratings or scores for the responses received from one or more chatbots 241 during the chat service 225 session. For example, the session manager 207 can monitor the performance of the orchestrator service 217 to accurately select the appropriate chatbot 241 registered with the chat services 225 and the satisfaction of the user receiving the responses from the chatbot 241 selected to respond to the user. Session manager 207 may log user satisfaction and preferences to a centralized database (such as data repository 227) and use historical data stored in the data repository 227 to further influence chatbot 241 selections made by the chatbot orchestration system 201 in the future (for either the same user or users having a similar user profile). For example, where positive feedback has been received for an identified conversation topic, the chatbot orchestration system 201 may be influenced to use the same chatbot 241 for responding to the same user (or similar users having a similar user profile) on the same or similar topic. Likewise, where a chatbot 241 was not satisfactory to a user, avoiding the use of the same chatbot 241 for the same or similar topic and instead defer the questions posed by the user's input to a different chatbot 241.

Embodiments of the session management module 203 may comprise a chatbot information manager 209 (referenced in the drawing as "chatbot info manager 209"). Embodiments of the chatbot info manager 209 may maintain a live list of active chatbots 241 and associated node locations of the chatbots 241 being utilized by the chatbot orchestration system 201 during one or more chat service 225 sessions. Embodiments of the chatbot info manager 209 may track and store relevant associations between the identified chatbot 241 being accessed live during a chat session and the intents or entities associated with the user input resulting in the selection of the particular chatbot 241 responding to the user's input during the chat service 225 session. Chatbot info manager 209 may relay the chatbot 241 selection, node location and/or intents and/or entities associated with the chatbot 241 selection to the session manager 207, wherein the chatbot 241 and/or associated intents and entities can be logged with the session manager 207, including the user profile, for future use by the chatbot orchestrator system 201.

Figure 7:
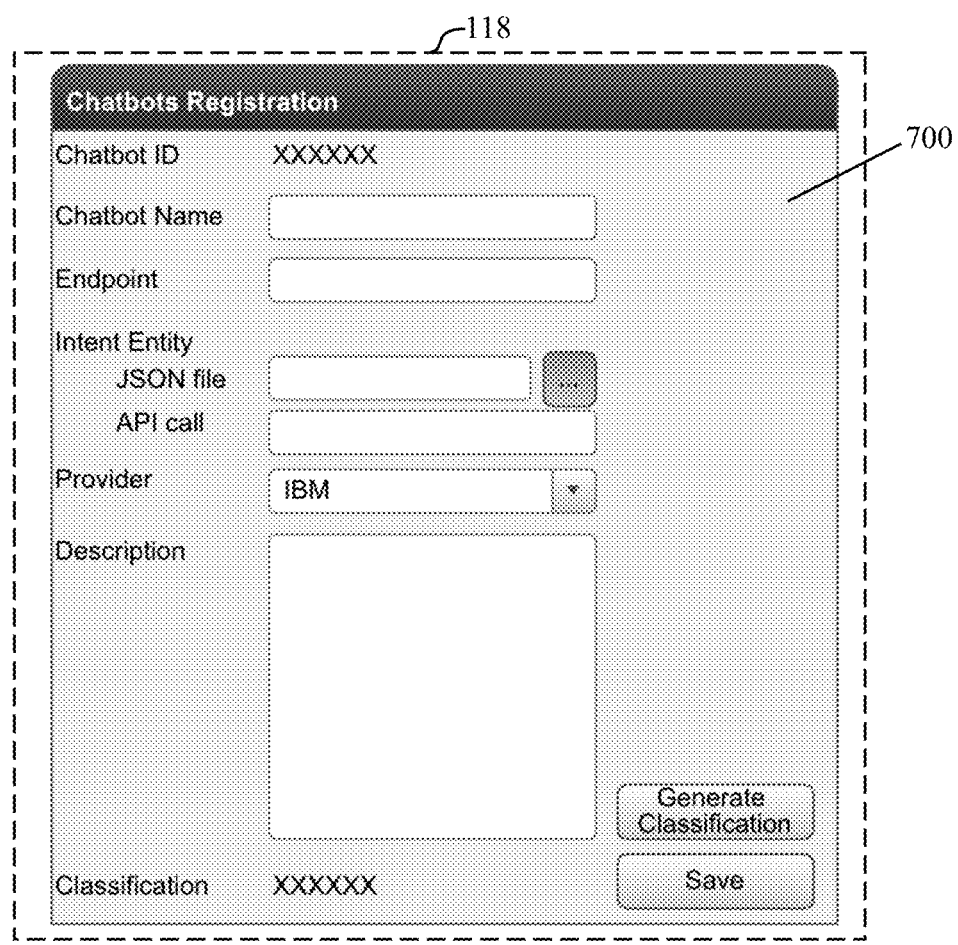
FIG. 7 depicts an embodiment of a user interface for registering a chatbot in accordance with the present disclosure

Embodiments of chatbot orchestration system 201 may comprise a natural language classifier 211. The natural language classifier 211 may perform functions, tasks or operations of the chatbot orchestration system 201 associated with registration of new chatbots 241 with chat services 225, that may be selected for responding to user input. During registration, the natural language classifier 211 may provide a user interface 700 to chatbot owners seeking to register one or more chatbots 241 with the chatbot services 225. An example of a user interface 700 is shown in FIG. 7. Embodiments of the user interface 700 may provide a form or other type of input method for chatbot owners to register one or more fields describing the chatbot 241 being registered. For instance, in some embodiments, chatbot owners may register a chatbot 241 by providing a chatbot name, provide a node or endpoint location where the chatbot 241 being registered can be contacted with requests, one or more intents or entities and a description of the chatbot. Intents or entities may be manually entered or registered with the natural language classifier 211 in some instances. In some embodiments, a list of intents or entities may be uploaded during the registration process. For example, intents or entities may be uploaded as a structured file (such as a .csv file), a semi-structured file (i.e. JSON) and/or an unstructured file (i.e. a text file). Embodiments of the registration process may further collect API call information from the chatbot owner, which may allow for the orchestrator service 217 to call a host system maintaining the chatbot 241 being registered, in order for requests for responses to the user input to be fulfilled by the registered chatbot 241. Chatbot registration 231 may be saved and stored to the data repository 227 for use by the classification module 213. For example, when querying one or more chatbots 241 designated as part of a particular classification in response to user input in the chat services 225.

Embodiments of the natural language classifier 211 (herein NLC 211) may further perform the function of generating chatbot classifications and mapping classifications to the chatbots 241 registered with the NLC 211. In some embodiments, the classification function of the NLC 211 may be performed by a classification module 213, while mapping functions directed toward mapping chatbots 241 to chatbot locations may be performed by the mapping module 215. The chatbot 241 classifications may be generated as a function of the intents, entities, and/or descriptions provided by the chatbot owner during the chatbot 241 registration process. Chatbot classification may be updated periodically by the NLC 211. Some chatbots 241 may be reclassified or updated to be placed in one or more additional classifications, or removed from certain classifications, for example based on negative feedback from users. Chatbots 241 classifications may be updated individually by NLC 211 or classification updates may be processed in batches periodically or at regular intervals.

NLC 211 may determine classifications of the registered chatbots using cognitive computing and machine learning techniques to identify patterns in the collected data from the chatbot registrations and make decisions about the classifications ascribed to the chatbots 241, with minimal intervention by a human user and/or administrator. Embodiments of the NLC 211 may also incorporate techniques of data mining, deep learning and data clustering to supplement and/or replace machine learning techniques that may be applied to the chatbot registration 231 data. Embodiments of the machine learning techniques that may be implemented by the NLC 211 to categorize chatbots 241 into classification, may include supervised learning, unsupervised learning and/or semi-supervised learning techniques. Supervised learning is a type of machine learning that may use one or more computer algorithms to train the NLC 211 using labelled examples during a training phase. The term "labelled example" may refer to the fact that during the training phase, there are desired inputs that will produce a known desired output by the NLC 211. The algorithm of the NLC 211 may be trained by receiving a set of inputs along with the corresponding correct outputs. To employ supervised learning, the NLC 211 may store a labelled dataset for learning, a dataset for testing and a final dataset from which the NLC 211 may use for applying classifications to chatbots 241 registered with the NLC 211.

The algorithm may learn by comparing the actual output with the correct outputs in order to find errors. The NLC 211 may modify the model of data according to the correct outputs to refine decision making, improving the accuracy of the automated decision making of the NLC 211 to provide the correct inputs (i.e. classifications). During the training phase, the NLC 211 may learn the correct outputs by analyzing and describing well known data and information, that may be stored by the data repository 227. Examples of data modeling may include classification, regression, prediction and gradient boosting. Under a supervised learning technique, the NLC 211 may be trained using historical data describing previously registered and/or used chatbots 241 to predict the appropriate classification of newly registered chatbots 241 with similar or the same intents, entities and/or descriptions.

Unsupervised learning techniques on the other hand may be used when there may be a lack of historical data that may be available to teach the NLC 211 using labelled examples of chatbot 241 classifications. Machine learning that is unsupervised may not be "told" the right answer the way supervised learning algorithms do. Instead, during unsupervised learning, the algorithm may explore the chatbot registration 231 data to find commonalities between the chatbot registration 231 data being explored. Examples of unsupervised machine learning may include self-organizing maps, nearest-neighbor mapping, k-means clustering, and singular value decomposition.

Embodiments of NLC 211 may also incorporate semi-supervised learning techniques in some situations. Semi-supervised learning may be used for the same applications as supervised learning. However, instead of using entirely labelled training examples of data during the training phase, there may be a mix of labelled and unlabeled examples during the training phase. For example, there may be a small or limited amount of labelled data being used as examples (i.e., a limited number of chatbots 241 registered with the NLC 211) alongside a larger amount of unlabeled data that may be presented to NLC 211 during the training phase. Suitable types of machine learning techniques that may use semi-supervised learning may include classification, regression and prediction models.

Embodiments of the classification module 213 can perform the task or function of matching user input received by the chat service 225 to one or more chatbots 241 registered within a classification and forward the suggested lists of chatbots 241, intents and/or entities to orchestrator service 217. For instance, when a user request is received from the chat service 225, based on the analyzed user input outputted from the analysis module 205, the classification module 213 can further analyze the intents, entities and other information parsed by the analysis module 205 to identify a classification of chatbot 241 that may be best suited for responding to the user input as a function of the analysis module 205 output. The classification module 213 may query the data repository 227 for chatbot registrations 231 classified by the classification module 213 to be within a particular classification. Results of the query may return a list of one or more chatbots 241 to the mapping module 215, along with the details describing the chatbots 241 returned by the query results, which may be obtained from the chatbot registration 231. Embodiments of the NLC 211 can select one or more chatbots 241 from the query results presented by the mapping module 215 and forward the selected chatbot 241 selections to the orchestrator service 217. For example, a user input may ask the question, "can I check the balance on my credit card." The analysis module 205 may detect important intents and entities that may be associated with the question, such as "check", "balance", "credit card" while the classification module 213 can identify the appropriate chatbots 241 for responding to the user input as chatbots 241 classified in banking, financial, credit card or other similar classifications. Mapping module 215 returns chatbots 241 classified under the identified classifications.

In some embodiments of the NLC 211, the NLC 211 may calculate a confidence interval for each of the matching chatbots 241 returned from the query of the chatbot registrations 231. The confidence interval may indicate a probability calculated by the chatbot orchestration system 201, that the chatbot 241 selected by the mapping module 215 can accurately respond to the user input correctly. For example, in response to a query for registered chatbots 241 within an identified classification, a chatbot 241, with a confidence interval of 95% may indicate a 95% probability that the chatbot 241 will accurately and correctly respond to the user request, whereas a second chatbot 241 returned by the query that has a 50% confidence interval indicates that the second chatbot 241 has a 50% probability of correctly answering the user's input correctly or accurately. Embodiments of the NLC 211 may forward a list of all chatbot registrations 231 returned by the query to the orchestrator service 217. In other embodiments, NLC 211 may forward a selective number of chatbot registrations 231 meeting the classification criteria of the query and having a confidence interval above a threshold level of confidence, to the orchestrator service 217. For example, mapping module 215 may forward a select list of chatbots 241 obtained from the query that are determined to have a confidence level of 75% or greater to the orchestrator service 217.

Embodiments of the chatbot orchestration system 201 may comprise an orchestrator service 217. The orchestrator service 217 may perform tasks, functions or processes associated with receiving the list of chatbots 241 from the NLC 211, along with additional information that may be transmitted, such as the intents, entities, etc., verify that the list of chatbots 241 comply with the orchestration rules 219 and select a chatbot 241 in compliance with the orchestration rules 219 to receive the user input. The orchestrator service 217 may transform the user input into an API format accepted by the selected chatbot 241 receiving the user input and route the request to the selected chatbot 241, in accordance with the orchestration rules 219, along with the session history 229, intents and entities. Orchestrator service 217 may receive the response from the selected chatbot's 241 API, exchange the received response back into a format of the chat service 225 and route the response to the chat service 225, where the response may be displayed on the chat service interface 237 for the user to see.

Orchestration rules 219 perform the function of determining which chatbots 241 (if any) are eligible to be selected by the orchestrator service 217 to respond to the user's input received by the chat service 225. The orchestration rules 219 may set one or more parameters that the orchestrator service 217 complies with when making a chatbot 241 selection. For example, orchestration rules 219 may set parameters such as defining one or more chatbots 241 that are blocked from being used, a minimum confidence intervals a chatbot 241 should have to be considered eligible for being selected to respond to user input, the maximum number of results from the query that may be considered by the orchestrator service 217, and one or more exceptions and/or how the occurrence of an exception may be handled. For example, in an instance where a chatbot 241 is provided by the NLC 211 to the orchestrator service 217, the orchestrator service 217 may check to determine that one or more chatbots 241 on the provided list are not blocked from being used based on the orchestration rules 219. Where the orchestration rules list a chatbot 241 as blocked, the orchestrator service 217 will not send a request to the blocked chatbot 241.

In some embodiments, orchestration rules 219 may be directed toward facilitating speedier responses from chatbots 241 selected to receive user input or users receiving the chatbot 241 output. For example, orchestration rules 219 may dictate timing of a chatbot 241 to acknowledge a sent request. If a chatbot 241 is non-responsive within a time frame set by the orchestration rules 219, the orchestrations service 217 may transmit a request and route the user input to a different chatbot 241. In another example, orchestration rules 219 may dictate an acceptable idle time for the user, wherein if the user does not provide input to the chat service 225 within the idle time set by the orchestrator service 217, the orchestrator service 217 may instruct the session manager 207 to end the chat service 225 session.

Embodiments of the orchestration rules 219 may govern the use of certain chatbots 241 selected by the NLC 211 based on rules directed toward confidence intervals. For example, orchestration rules 219 may set a minimum level of confidence that a selected chatbots 241 meet in order to receive a request from the orchestrator service 217. Chatbots 241 that are on the list of selected chatbots 241 with the appropriate classification but fail to meet the orchestration rules 219 for the threshold level of confidence may not be used by the orchestrator service 217 to respond to a particular user input. In some embodiments, additional orchestrations rules 219 may be deployed when the list of chatbots 241 selected by the NLC 211 does not comprise a chatbot 241 that meets the orchestration rules 219. For example, if the list of chatbots 241 selected by the NLC 211 does not comprise a chatbot 241 that has a confidence level above the threshold set by the orchestration rules 219, the orchestration rules 219 may prescribe an alternative resource to use instead of a registered chatbot 241. For instance, the orchestrator service 217 may query a search engine 238 for an unregistered chatbot with a confidence interval that meets the threshold level set by the orchestration rules, route the user input along with the intents and entities to a discovery service 239 comprising an advanced artificial intelligence capable of determining an appropriate chatbot 241 (or answer the user input directly) and/or route the user input to a human support service 240, wherein a human representative may manually respond to the user input.

In some embodiments, the list of chatbots 241 selected by the NLC 211 within the identified classification may return zero results. Embodiments of the orchestration rules 219 may include an exception for such a situation. For example, when zero chatbots 241 are selected and routed to the orchestrator service 217 by the NLC 211, the orchestrator service 217 may deploy a search engine 238, discovery service 239 and/or human support service 240 to resolve the issue and respond to the user input. For instance, the orchestrator service 217 may identify an unregistered chatbot capable of accurately responding to the user via a search engine 238 or discovery service 239. The orchestrator service 217 deploy the discovery service 23 to identify an existing registered chatbot 241 that may have been misclassified by the NLC 211 during registration or identify a misclassification of the user input based on the intent and entities. In some embodiments, the discovery service 239 may be employed in situations where the user input comprises a long or complicated question that might not be suitable for any chatbot 241. Instead, the AI of the discovery service 239 may answer the question directly. In some embodiments, the orchestrator service 217 may avoid finding another chatbot 241 to use entirely and route questions that may be difficult, complex or unable to find an appropriate chatbot 241 to a human support service 240.

Embodiments of the orchestrator service 217 may comprise a format exchanger 221. The format exchanger 221 may perform the functions, tasks or processes of the orchestrator service 217 directed toward transforming the format of the user input, session history 229, intents and/or entities into a format of the API that is used by the chatbot 241 selected to receive the user input by the orchestrator service 217. For example, the format exchanger 221 may format fields such as the conversation_Id, vendor_Id, conversation_Id, confidence_level, conversation_Id into a field accepted by the API of the selected chatbot 241. Moreover, the format exchanger 221 may transform the session history 229, intents and entities into a format accepted by the selected chatbot 241 API. In response to the requests routed by the orchestrator service 217, the selected chatbots 241 may return a response to the orchestrator service 217. In some embodiments, the response returned by the chatbots 241 may be in the API format of the chatbot 241. In some instances, the chatbot's API format may not be an acceptable format for the chat services 225, which may require the format exchanger 221 to transform the resulting response received from the chatbot 241 into a format usable by the chat services 225. Once transformed back into the native format or other acceptable format recognized by the chat services 225, the orchestrator service 217 may route the formatted response to the chat services 225. Embodiments of the orchestrator services 217 may further log the request and response from the selected chatbot 241, store the chat history to the data repository 227 and/or submit follow up requests or node requests to non-responsive chatbots 241.

Figure 5:
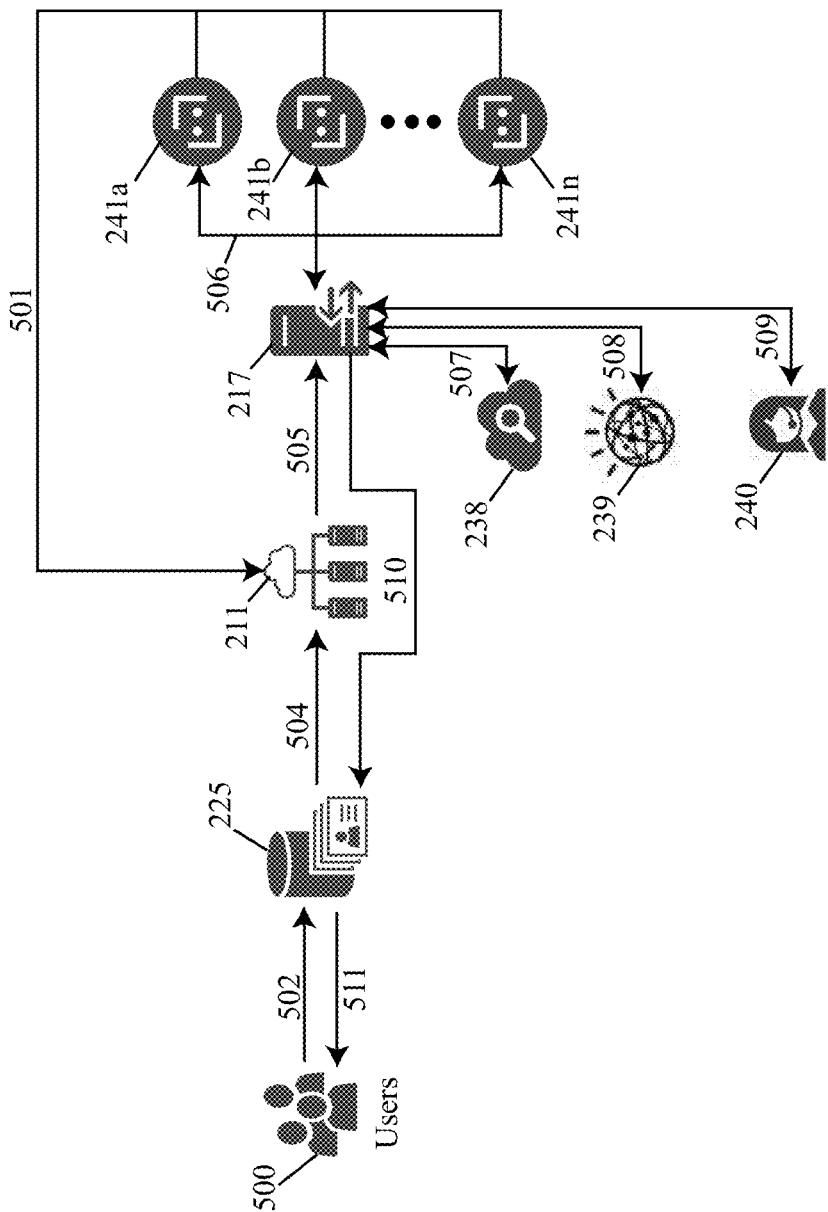
FIG. 5 depicts an embodiment of a workflow diagram describing an implementation of chat services in accordance with the present disclosure.

Referring to the drawings, FIG. 5 depicts a flow chart describing a workflow of the chatbot orchestration system 201 providing chat services 225 using an orchestrator service 217 to selectively route user input to one or more chatbots 241, search engine 238, discovery service 239 and/or human support service 240. The workflow may begin at line 501 which indicates the registration of one or more chatbots 241a, 241b . . . 241n with the NLC 211. The NLC 211 generates a classification for each registered chatbot 241 based on the registration information, including the intents, entities and description of each chatbot 241 provided by the chatbot owners during registration with the NLC 211.

Users 500 may interface with the chat service 225 via the chat service interface 237. Line 502 of the workflow indicates user input being entered into the chat service interface 237 and transmitted from the user system 235 to the chat service 225 hosted by the chat orchestration system 201 via network 250. Analytics module 205 of the of the session management module 203 analyzes and parses the user input for one or more intents and/or entities present in the user input. The analytics module 205 may prioritize the identified intents or entities based on a level of priority or importance. Higher priority intents or entities may be highlighted for the NLC 211. Line 504 may describe the output from the analytics module 205 being transmitted to the NLC 211 for identification of a classification and a chatbot 241 that may be appropriate for responding to the user input. NLC 211 may use the analysis of the user input provided by the analytics module 205 to select a classification of chatbot 241. NLC 211 may query chatbot registrations 231 for chatbots 241 that have been classified with the selected classification. In some embodiments, the NLC 211 may calculate a confidence interval for the chatbots 241 within the selected classification. Chatbots 241 matched to the classification may be selected by the mapping module 215 and directed to the orchestrator service 217 via line 505.

Orchestrator service 217 receiving the list chatbots 241 selected by the NLC 211 may select a chatbot 241, search engine 238, discovery service 239 or human support service 240 based on the orchestration rules 219 governing the orchestrator service 217. Where one or more chatbot 241 provided within the list sent by NLC 211 meets the orchestration rules 219 of the orchestrator service 217, the orchestrator service 217 may transform the user input, entities, intents, session history 229 into an acceptable API format of the selected chatbot 241 and route the formatted information to the chatbot 241 via line 506. For example, the orchestrator service 217 may select a chatbot 241 from the list provided by the NLC 211 which comprises a confidence level greater than a threshold set by the orchestration rules 219 and the selected chatbot 241 complies with the remaining orchestration rule 219 (e.g. not a blocked chatbot). The format exchanger 221 of the orchestrator service 217 converts the user input, intents, entities and session history 229 into the API format of the selected chatbot 241 and routes the formatted request to the selected chatbot 241. Alternatively, where chatbots 241 listed by the NLC 211 are non-existent, insufficient or not in compliance with the orchestration rules 219, the orchestrator service 217 may route the user input, intents, entities, session history 229 and other pertinent information to an alternative resource dictated by the orchestration rules 219. For example, a search engine 238 via line 507, a discovery service 239 via line 508 and/or a human support service 240 via line 509.

Responses from the selected chatbot 241, search engine 238, discovery service 239 and/or human support service 240 may be returned to the orchestrator service 217. Responses being returned to the chat service 225 may be exchanged by the format exchanger 221 back into a format recognized by the chat service 225 and routed back to the chat service 225 via line 510. Orchestrator service 217 may log the request and response receive in the data repository 227. The response received from the orchestrator service via line 510 may be routed to the user system 235 via line 511 and displayed by a human-readable display 118 of the user system 235.

Figure 6:
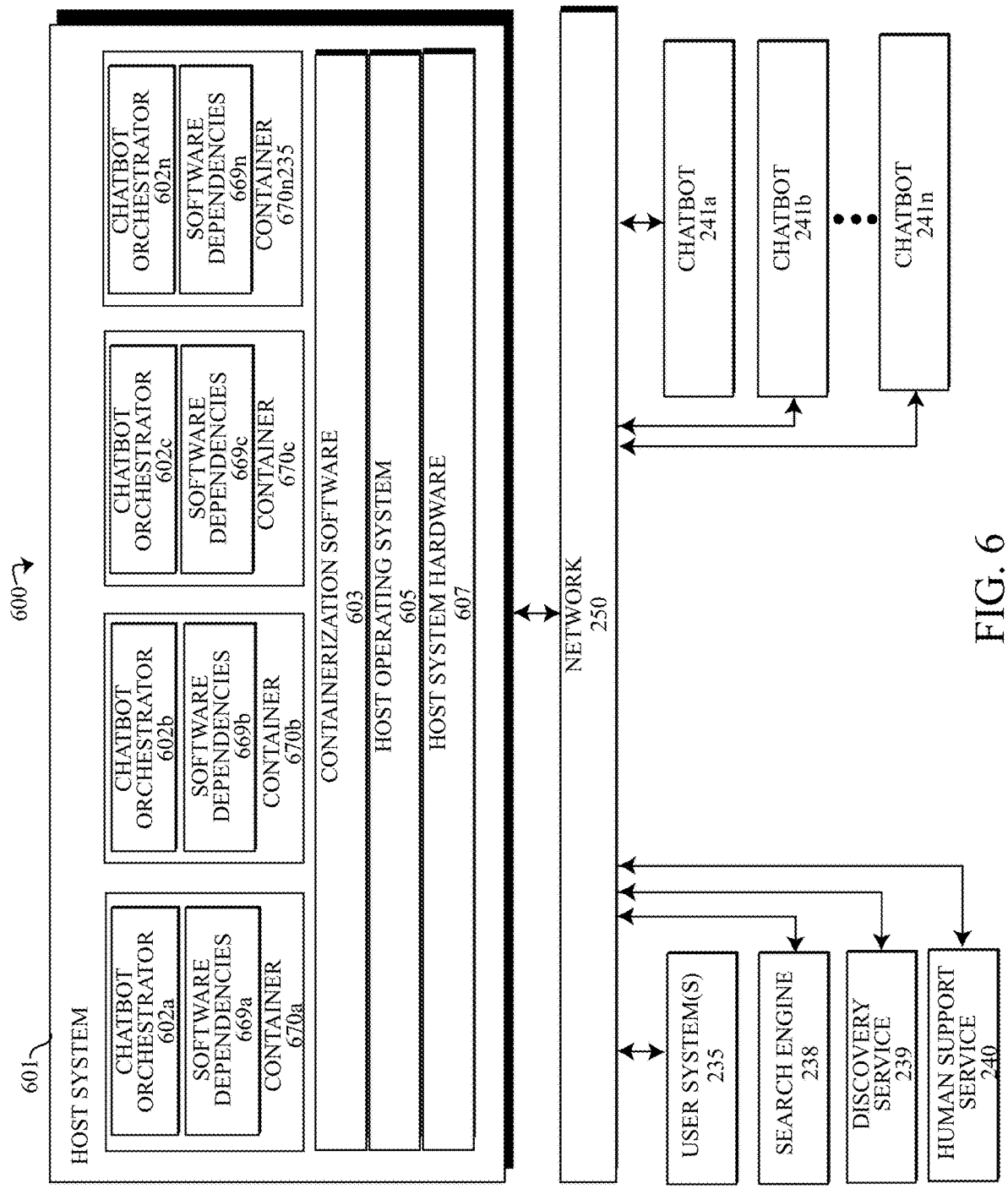
FIG. 6 depicts an alternate embodiment of a containerized computing environment for orchestrating and delivering heterogenous chat services to users from a plurality of registered chatbots.

Referring to the drawings, FIG. 6 depicts an alternative embodiment, comprising computing environment 600, wherein host system 601 containerizes the services and functions provided by the chatbot orchestration system 201 into multiple container environments (depicted as container 670a-670n), including chat services 225, orchestrator services 217, NLC 211 and data repository 227. The containers 670 containerizing the services and functions of the chatbot orchestration system 201 may contain a chatbot orchestrator 602a-602n image and the software dependencies 669a-669n, within the container's 670 operating environment. The host system 601 may run a multi-user operating system (i.e. the host operating system 605) and provide computing resources via the host system hardware 607 to one or more containers 670a-670n (referred to generally as containers 670) comprising the containerized computer environment for the chatbot orchestrator 602 software to execute and perform the containerized functions of the chatbot orchestration system 201.

Embodiments of computing environment 600 may be organized into a plurality of data centers that may span multiple networks, domains, and/or geolocations. The data centers may reside at physical locations in some embodiments, while in other embodiments, the data centers may comprise a plurality of host systems 601 distributed across a cloud network and/or a combination of physically localized and distributed host systems 601. Data centers may include one or more host systems 601, providing host system hardware 607, a host operating system 605 and/or containerization software 603 such as, but not limited to, the open-source Docker and/or OpenShift software, to execute and run the containerized chatbot orchestrator encapsulated within the environment of the containers 670, as shown in FIG. 6. Although the exemplary embodiment depicted in FIG. 6 includes three containers 670, 670*b*, 670*c*, 670*n* the embodiment of FIG. 6 is merely illustrative of the concept that a plurality of containers 670 can be hosted by a host system 601. The embodiment of FIG. 6 should in no way be considered to imply that the host systems 601 is limited to hosting only three containers 670. The number of containers 670 hosted by a host system 601 may vary depending on the amount of computing resources available, based on the host system hardware 607 and the amount of computing resources required by chatbot orchestrators 602 images being executed within the containers 670 by the containerization software 603.

Embodiments of the containerization software 603 may comprise a containerization engine (not shown). The containerization engine may be a client-server application which may comprise a server program running a daemon process, a REST API specifying one or more interfaces that the chatbot orchestrator 602 image and/or other programs may use to talk to the daemon process and provide instructions to the orchestrator 602, as well as a command-line interface (CLI) client for inputting instructions. In one embodiment, the user system 235 may input commands using a CLI to communicate with the containerization software 603 of the host system 601. In the exemplary embodiment depicted in FIG. 6, commands provided by the user system 235 to the host system 601 may be input via the chat service interface 237 loaded into the memory 105 or persistent storage 106 of the user system 235 interfacing with the host system 601.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 603, including one or more software images residing within the containers 670, the containers 670 themselves, networks 250, data volumes, plugins, etc. An image may be a read-only template with instructions for creating a container 670 and may be customizable. Containers 670 may be a runnable instance of the software image. Containers 670 can be created, started, stopped, moved or deleted using a containerization software 603 API or via the CLI. Containers 670 can be connected to one or more networks 250, can be attached to a storage device and/or create a new image based on the current state of a container 670.

Embodiments of the host system 601, illustrated in the block diagram of FIG. 6, depict a plurality of containers 670, wherein a container 670 may comprise an image of a chatbot orchestrator 602 and software dependencies 669*a*-669*n* (generally referred to herein as software dependencies 669) for running instances of the chatbot orchestrator 602 within the environment of the container 670. Software dependencies 669 may include application code, system tools, settings, runtime environment and system libraries. The images of the chatbot orchestrator 602 depicted within the containers 670 may be duplicate versions of the same image. In some embodiments, the images of the chatbot orchestrator 602 may be customized variations of one another, based on a common image used as the basis for the customized variations of the chatbot orchestrator, while in some embodiments, one or more of the chatbot orchestrators may be independently created and developed using entirely different images.

Method for Orchestrating Chatbot Services

Figure 8A:
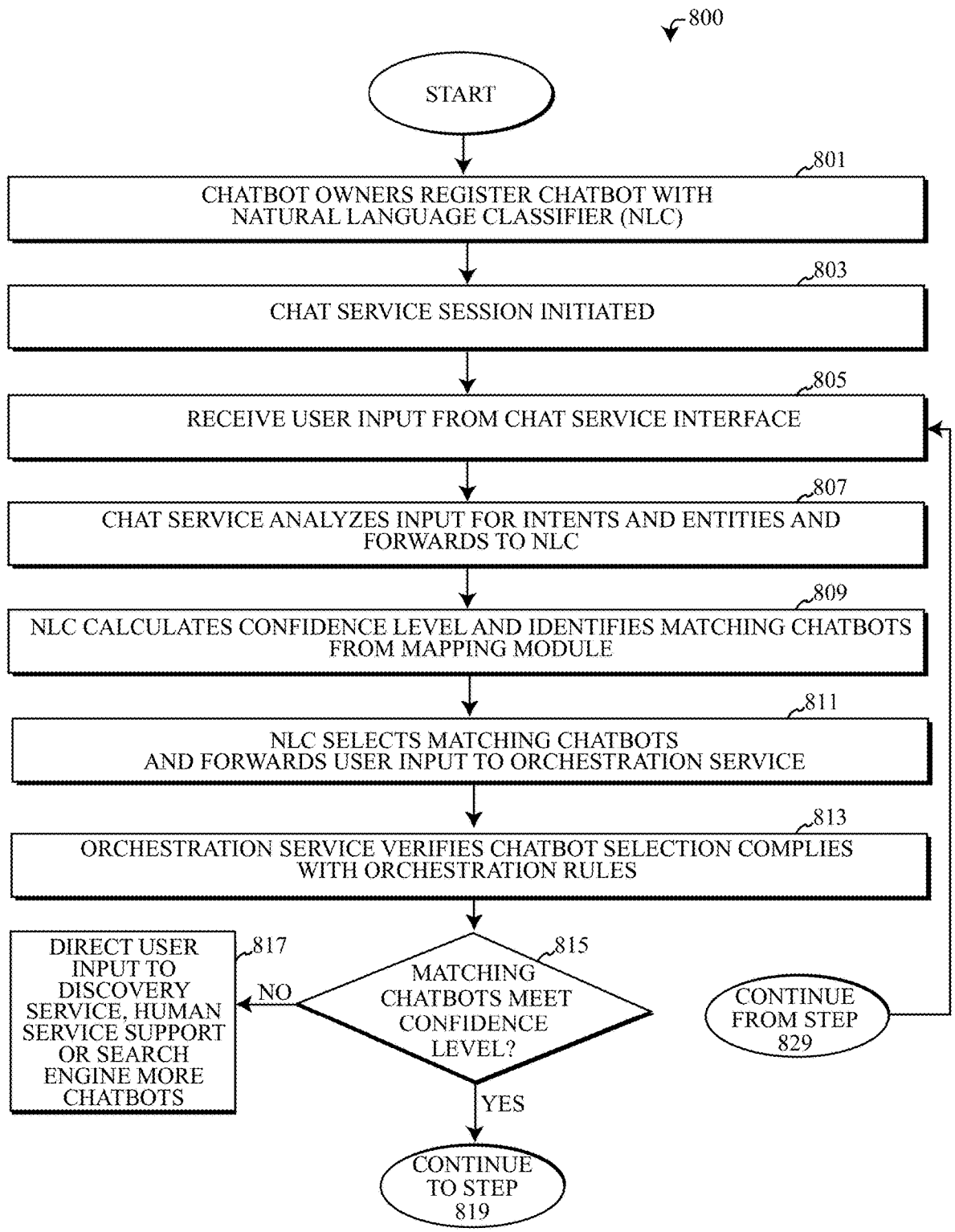
FIG. 8a depicts an embodiment of an algorithm implementing a computerized method for orchestrating and delivering heterogenous chat services.
Figure 8B:
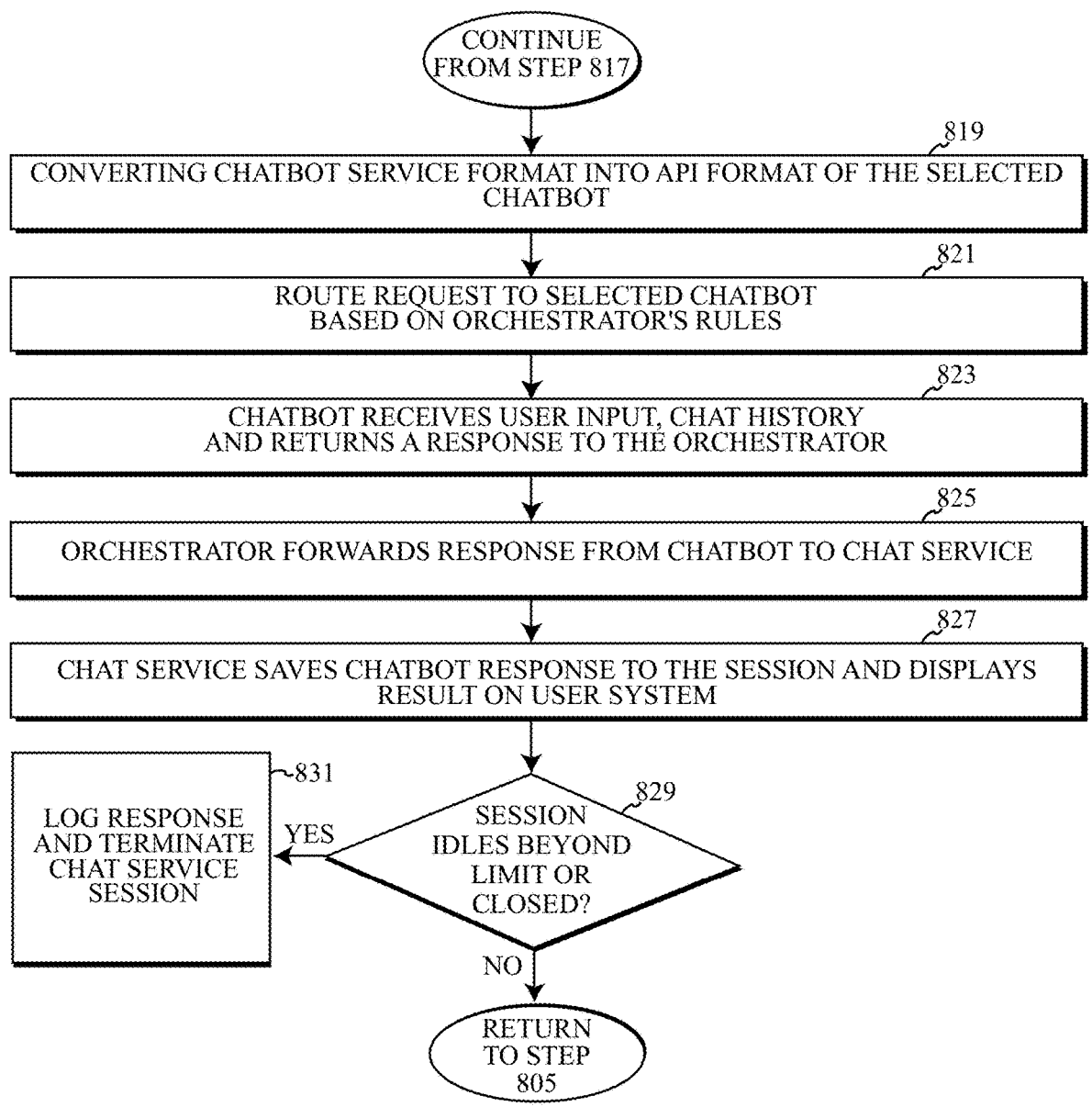
FIG. 8b depicts a continuation of the algorithm of FIG. 8a implementing a computerized method for orchestrating and delivering heterogenous chat services in accordance with the present disclosure.

The drawings of FIGS. 8*a*-8*b* represent an embodiment of an algorithm 800 performing a computer-implemented method for orchestrating chatbot services 225 to respond to user input through a heterogenous chat service 225 receiving the user input and orchestrating the selection of a chatbot 241 to generate the response, from a list of chatbots 241 registered with the chat service 225. The algorithm 800, as shown and described by FIGS. 2*a*-7, may use one or more computer systems, defined generically by data processing system 100 of FIG. 1, and more specifically by the embodiments of specialized data processing systems depicted in FIGS. 2*a*-7 as described herein. A person skilled in the art should recognize that the steps of the algorithm 800 described in FIGS. 8*a*-8*b* may be performed in a different order than presented. The algorithm 800 may not necessarily require all the steps described herein to be performed. Rather, some embodiments of algorithm 800 may alter the methods by performing a subset of steps using one or more of the steps discussed below.

Embodiments of the algorithm 800 may begin at step 801. In step 801, one or more owners or operators of a chatbot 241 may register the chatbot 241 natural language classifier 211. During the registration process, the owners or operators of the chatbot 241 being registered may provide a detailed set of information to the NLC 211, including the chatbot's name, endpoint location, one or more intents or entities associated with the chatbot 241, the name of the owner or provider of the chatbot 241 and a description of the chatbot 241. From the registration information provided, the NLC 211 may assign a chatbot ID and generate one or more classifications assigned to the chatbot 241. Registration information provided during the registration process may be stored by the data repository 227 as chatbot registration 231.

In step 803 of algorithm 800, chat service 225 session may be initiated by a user accessing the chat service 225 via a chat service interface 237 of a user system 235. Session manager 207 may create a new instance of the chat service 225 and log the session history 229 to the data repository 227. Including, the time the session was initiated and username or profile of the user initiating the session. Embodiments of the session manager 207 may further load a profile associated with the user and/or user settings or preferences stored by the user profile. Embodiments of the session manager 207 may track the session time, including the idle time before receiving user input from the chat service interface 237. In some embodiments, where the idle time is greater than a predetermined length of time, the session manager 207 may close the session if the user does not provide user input within the allotted idle time.

In step 805, the chat service 225 receives user input from the chat service interface 237. Embodiments of the user input may be in the form of text, images, audio, video, an electronic document or file, or any other forms of input that may be accepted by the chat service interface 237. In step 807, the chat service 225 receiving the user input may analyze the user input for intents, entities, content, tone or sentiment and output the processed user input the NLC 211. For example, analysis module 205 may perform natural language processing using a natural language processor 261 and/or content/artifact analyzer 291 to understand the user input, the context and content thereof, as well as identify one or more topics discussed and/or sentiment of the user. The natural language processor 261 may identify one or more intents or entities embedded within the user input, highlight the intents or entities and draw conclusions based on the analysis and processing of the user input. Intents or entities of higher priority may be highlighted and prioritized to the NLC 211.

In step 809 of algorithm 800, the analysis of the user input that was outputted by the analysis module 205 may be transmitted to the NLC 211 along with the session history 229 saved so far by the session manager 207, intents and entities. The NLC 211 may, as a function of the output received from the analysis module 205 identify one or more classifications of registered chatbots 241 that may assist in responding to the user input. Embodiments of the classification module 213 may query the chatbot registrations 231 maintained by data repository 227 for one or more chatbots 241 registered with the appropriate classification determined by the NLC 211. Embodiments of the NLC 211 may further calculate a confidence level for each of the registered chatbots 241 returned by the query within the queried classification and the NLC 211 may sort the chatbots 241 by the calculated confidence interval. For example, from highest confidence interval to lowest. Chatbots 241 matching the classification requirements of the NLC 211 may be selected by the mapping module 215 and forwarded to the orchestrator services in step 811.

In step 813, the orchestrator service 217 verifies that the chatbots selected and forwarded by the mapping module 215 comply with the orchestration rules 219 of the orchestrator service 217. For example, meeting a minimum confidence interval set by the orchestration rules 219. Embodiments of the orchestrator service 217 may select the chatbot 241 with the highest confidence interval listed by the output from the NLC 211 and verify the confidence interval is greater than the threshold set by the orchestration rules. In step 815, a determination is made by the algorithm 800 whether the matching chatbot selected in in step 813 meets the threshold confidence interval and/or there is a chatbot 241 listed in output from the NLC 211. If in step 815, the highest rated chatbot 241 does not meet the minimum confidence interval prescribed by the orchestration rules 219 or the output from the NLC 211 does not list any chatbots 241 within the prescribed classification for responding to the user input, the algorithm may proceed to step 817, wherein the orchestrator services 217 may employ assistance from a search engine 238, discovery service 239 or human support service 240 to either find an unregistered chatbot to respond to the user input or respond the user input directly from the search engine 238, discovery service 239 and/or human support service 240. Conversely, if the matching chatbot 241 meets the orchestration rules 219, including the threshold of the confidence interval, the algorithm 800 may proceed to step 819.

In step 819, the format exchanger 221 of the orchestrator services 217 transforms the user input, intent, entities and session history 229 from a native format maintained by the chat services 225 and/or data repository 227 into an API format acceptable for transmission to the selected chatbot 241. In step 821, the request for a response from the selected chatbot 241 prepared and formatted into the API format in step 819 may be routed to the chatbot 241 selected based on the orchestration rules 219. In step 823, the selected chatbot receiving the request for a providing a response to the user input returns a response to the orchestrator services 217.

In step 825, the orchestrator service 217 may forward the response received from the selected chatbot 241 to the chatbot service 225. In some embodiments, the format exchanger 221 may convert the response received from the chatbot 241 in the chatbot's API format back into an acceptable format understood by the chatbot services 225. Once placed in a format understood by the chatbot services 225, the orchestrator service 217 may route the formatted response back to the chatbot services 225. In step 827, the chat services 225 may save the chatbot response to the session history 229 and/or display the response received from the chatbot on the user system 235.

In step 829, a determination is made by the session manager 207 and/or orchestrator service 217 whether the session has been idle beyond a limit prescribed by the orchestration rules 219 or the session has been closed by the user. If the session has idled for too long without receiving new input from the user or the user has closed the session, the session manager may log responses received from the chatbot 241 in the session history 229 and chat service 225 session. Conversely, if the session of the chat services 225 has not idled beyond the prescribed limit of the orchestration rules 219 or closed by the user, the algorithm 800 may return to step 805 and receive new user input from the chat service interface 237.

What is claimed is:

1. A computer-implemented method comprising:
   receiving, by a processor, user input from a chat service interface;
   extracting, by the processor, one or more intents and entities from the user input;
   matching, by the processor, the one or more intents and entities extracted from the user input to one or more chatbots maintained on a list of registered chatbots as a function of a classification associated with the one or more chatbots by a natural language classifier maintaining the list of registered chatbots;
   calculating, by the processor, a confidence interval indicating a probability that a matching chatbot is capable of correctly responding to the user input;
   selecting, by the processor, the matching chatbot from the list of registered chatbots with a highest confidence interval;
   verifying, by the processor, that the matching chatbot selected from the list of registered chatbots complies with orchestration rules;
   in response to verifying that the selection of the matching chatbot complies with the orchestration rules, routing, by the processor, the user input to the matching chatbot with the highest confidence interval and displaying, by a processor, a response from the matching chatbot with the highest confidence interval on the chat service interface; and
   in response to verifying that the selection of the matching chatbot does not comply with the orchestration rules because the matching chatbot with the highest confidence interval is below a threshold level, forwarding, by a processor, the user input to an alternative resource configured to identify an un-registered chatbot having a confidence level above the threshold level, the alternative resource selected from a group consisting of a discovery service, and a search engine.

2. The computer-implemented method of claim 1, further comprising:

registering, by the processor, one or more chatbots with the natural language classifier, wherein registration comprises providing a chatbot name, intent, entity and description;
generating, by the processor, one or more classifications for each of the one or more chatbots being registered; and
inputting, by the processor, the one or more chatbots being registered and the one or more classifications into the list of registered chatbots.

3. The computer-implemented method of claim 1, further comprising:
in response to verifying that the selection of the matching chatbot does not comply with the orchestration rules because the matching chatbot with the highest confidence interval is below a threshold level, forwarding, by a processor, the user input to a human-operated support service.

4. The computer-implemented method of claim 1, wherein the step of forwarding the user input to the matching chatbot further comprises:
converting, by the processor, the user input into a format of an application program interface (API) of the matching chatbot; and
attaching, by the processor, a history of user inputs inputted into the chat service interface during a current chat service session.

5. The computer-implemented method of claim 2, further comprising:
logging, by the processor, a user satisfaction rating based on the response received from the matching chatbot; and
updating, by the processor, registration information associated with the matching chatbot based on the user satisfaction rating.

6. The computer-implemented method of claim 5, further comprising:
further updating, by the processor, classification of the matching chatbot as a function of updating the registration information based on the user satisfaction rating.

7. A computer system comprising:
a processor; and
a computer-readable storage media coupled to the processor, wherein the computer-readable storage media contains program instructions executing a computer-implemented method comprising:
receiving, by the processor, user input from a chat service interface;
extracting, by the processor, one or more intents and entities from the user input;
matching, by the processor, the one or more intents and entities extracted from the user input to one or more chatbots maintained on a list of registered chatbots as a function of a classification associated with the one or more chatbots by a natural language classifier maintaining the list of registered chatbots;
calculating, by the processor, a confidence interval indicating a probability that a matching chatbot is capable of correctly responding to the user input;
selecting, by the processor, the matching chatbot from the list of registered chatbots with a highest confidence interval;
verifying, by the processor, that the matching chatbot selected from the list of registered chatbots complies with orchestration rules;
in response to verifying that the selection of the matching chatbot complies with the orchestration rules, routing, by the processor, the user input to the matching chatbot with the highest confidence interval and displaying, by the processor, a response from the matching chatbot with the highest confidence interval on the chat service interface;
in response to verifying that the selection of the matching chatbot does not comply with the orchestration rules because the matching chatbot with the highest confidence interval is below a threshold level, forwarding, by the processor, the user input to an alternative resource configured to identify an unregistered chatbot having a confidence level above the threshold level, the alternative resource selected from a group consisting of an advanced AI discovery service, and a search engine.

8. The computer system of claim 7, further comprising:
registering, by the processor, one or more chatbots with the natural language classifier, wherein registration comprises providing a chatbot name, intent, entity and description;
generating, by the processor, one or more classifications for each of the one or more chatbots registered; and
inputting, by the processor, the one or more chatbots registered and the one or more classifications into the list of registered chatbots.

9. The computer system of claim 7, further comprising:
in response to verifying that the selection of the matching chatbot does not comply with the orchestration rules because the matching chatbot with the highest confidence interval is below a threshold level, forwarding, by the processor, the user input to a human-operated support service.

10. The computer system of claim 7, wherein the step of forwarding the user input to the matching chatbot further comprises:
converting, by the processor, the user input into a format of an application program interface (API) of the matching chatbot; and
attaching, by the processor, a history of user inputs inputted into the chat service interface during a current chat service session.

11. The computer system of claim 8, further comprising:
logging, by the processor, a user satisfaction rating based on the response received from the matching chatbot; and
updating, by the processor, registration information associated with the matching chatbot based on the user satisfaction rating.

12. The computer system of claim 11, further comprising:
further updating, by the processor, classification of the matching chatbot as a function of updating the registration information based on the user satisfaction rating.

13. A computer program product comprising:
one or more computer-readable storage media having computer-readable program instructions stored on the one or more computer-readable storage media said program instructions executes a computer-implemented method comprising the steps of:
receiving, by a processor, user input from a chat service interface;
extracting, by the processor, one or more intents and entities from the user input;
matching, by the processor, the one or more intents and entities extracted from the user input to one or more chatbots maintained on a list of registered chatbots as a function of a classification associated with the one or more chatbots by a natural language classifier maintaining the list of registered chatbots;

calculating, by the processor, a confidence interval indicating a probability that a matching chatbot is capable of correctly responding to the user input;

selecting, by the processor, the matching chatbot from the list of registered chatbots with a highest confidence interval;

verifying, by the processor, that the matching chatbot selected from the list of registered chatbots complies with orchestration rules;

in response to verifying that the selection of the matching chatbot complies with the orchestration rules, routing, by the processor, the user input to the matching chatbot with the highest confidence interval and displaying, by the processor, a response from the matching chatbot with the highest confidence interval on the chat service interface; and in response to verifying that the selection of the matching chatbot does not comply with the orchestration rules because the matching chatbot with the highest confidence interval is below a threshold level, forwarding, by the processor, the user input to an alternative resource configured to identify an unregistered chatbot having a confidence level above the threshold level, the alternative resource selected from a group consisting of an advanced AI discovery service, and a search engine.

14. The computer program product of claim 13, further comprising:

registering, by the processor, one or more chatbots with the natural language classifier, wherein registration comprises providing a chatbot name, intent, entity and description;

generating, by the processor, one or more classifications for each of the one or more chatbots registered; and inputting, by the processor, the one or more chatbots registered and the one or more classifications into the list of registered chatbots.

15. The computer program product of claim 13, further comprising:

in response to verifying that the selection of the matching chatbot does not comply with the orchestration rules because the matching chatbot with the highest confidence interval is below a threshold level, forwarding, by the processor, the user input to a human-operated support service.

16. The computer program product of claim 13, wherein the step of forwarding the user input to the matching chatbot further comprises:

converting, by the processor, the user input into a format of an application program interface (API) of the matching chatbot; and attaching, by the processor, a history of user inputs inputted into the chat service interface during a current chat service session.

17. The computer program product of claim 14, further comprising:

logging, by the processor, a user satisfaction rating based on the response received from the matching chatbot;

updating, by the processor, registration information associated with the matching chatbot based on the user satisfaction rating; and further updating, by the processor, classification of the matching chatbot as a function of updating the registration information based on the user satisfaction rating.

* * * * *